United States Patent
Coffield, Jr.

[15] 3,677,588
[45] July 18, 1972

[54] FASTENER

[72] Inventor: George C. Coffield, Jr., Pleasant Valley, Iowa

[73] Assignee: The United States of America as represented by the Secretary of the Army

[22] Filed: Dec. 1, 1970

[21] Appl. No.: 93,936

[52] U.S. Cl. ..........................287/189.36F, 85/1 R, 151/41.7
[51] Int. Cl. ........................................F16b 5/02, F16b 35/00
[58] Field of Search ....................151/41.7, 41.76, 41.71, 69; 287/189.36 F, 189.36 D, 189.36 R, 117, 108; 85/1 H, 42, 1 R, 51

[56] References Cited

UNITED STATES PATENTS

| 1,356,404 | 10/1920 | Robinson | 85/1 R UX |
| 1,507,488 | 9/1924 | Kraemer | 151/41.76 |
| 2,281,482 | 4/1942 | Crayton | 85/1 R X |
| 2,658,699 | 11/1953 | Rovas | 85/51 UX |
| 2,749,789 | 6/1956 | Sam | 85/51 X |

Primary Examiner—Ramon S. Britts
Attorney—Harry M. Saragovitz, Edward J. Kelly, Herbert Berl and Albert E. Arnold, Jr.

[57] ABSTRACT

A fastener assembly is fixedly attached to a stud recessed in a partition and includes a set screw attached by an adaptor to the stud for axial extension therefrom through a hole in the item to be fastened. A nut engaged with the extending end of the set screw is tightened against a washer larger in diameter than the hole and mounted on the set screw to draw the item to the partition and secure it thereto.

5 Claims, 4 Drawing Figures

Patented July 18, 1972
3,677,588
2 Sheets-Sheet 1
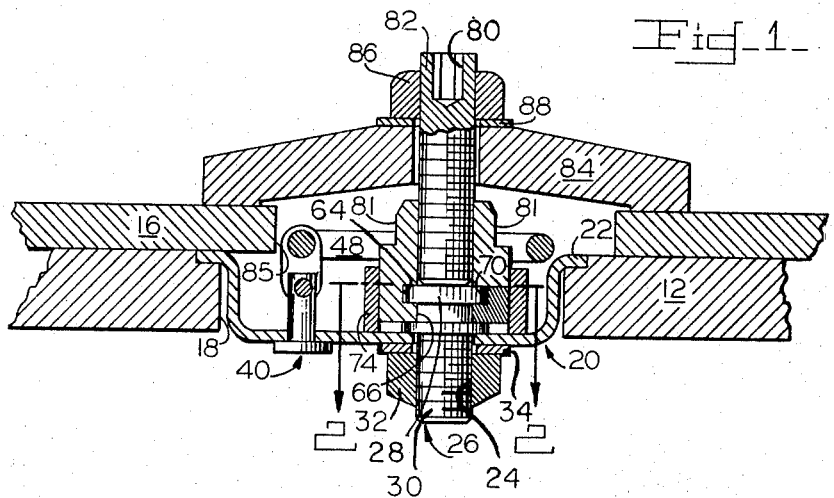
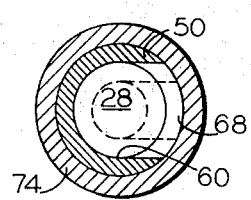
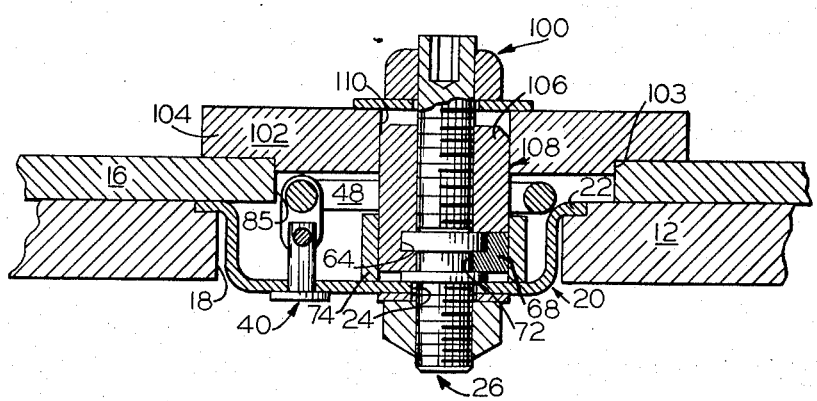
INVENTOR
George G. Coeffield, Jr.
BY
Harry M. Saragovitz, Edward J. Kelly,
Herbert Berl, & Albert E. Arnold
ATTORNEYS

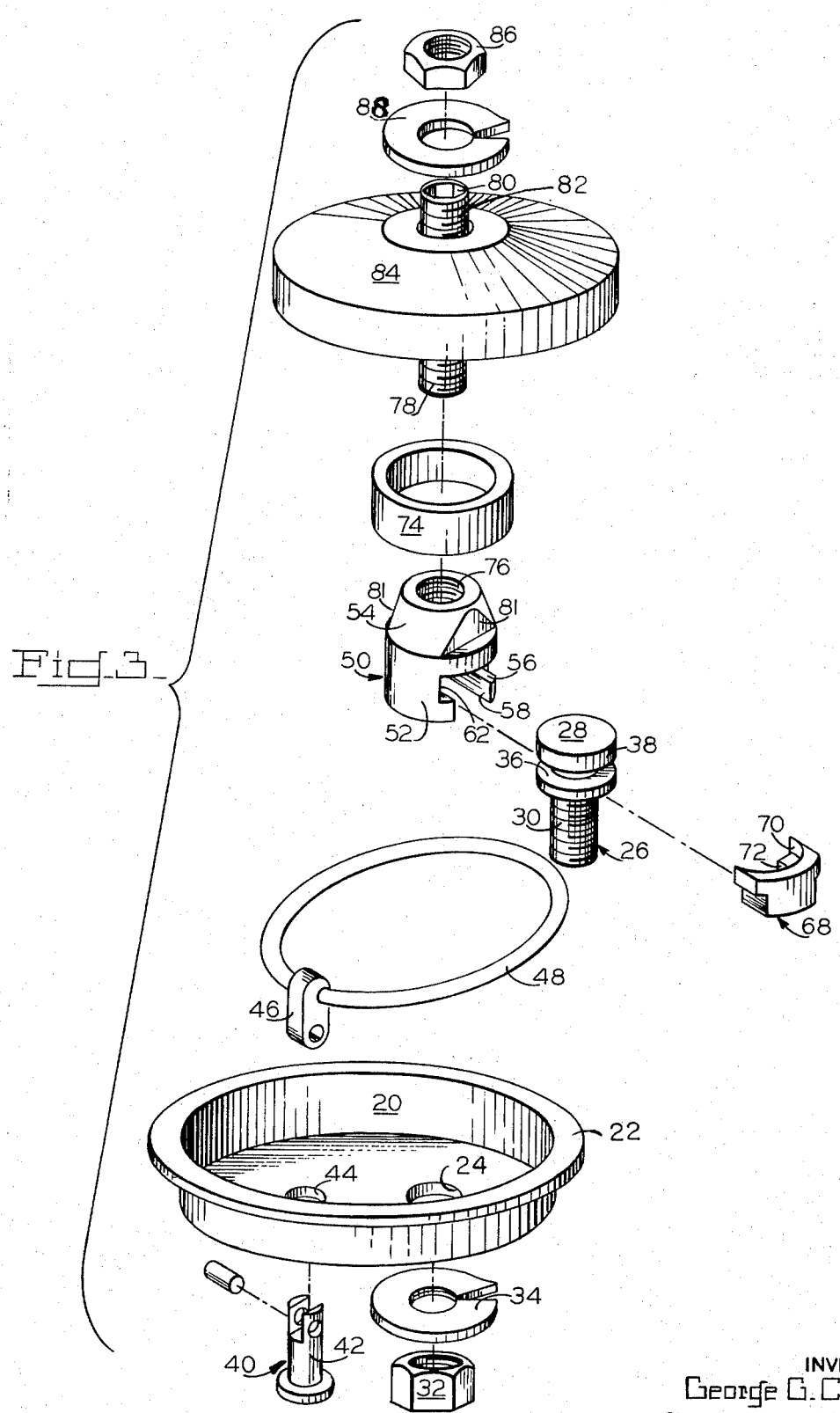

3,677,588

FASTENER

The invention described herein may be manufactured, used, and licensed by or for the Government for governmental purposes without the payment to me of any royalty thereon.

BACKGROUND OF THE INVENTION

This invention relates to fastening devices and pertains more particularly to fasteners for rigidly securing accessory equipment or cargo to a structural element in, for example, an aircraft. Aircraft decks and bulkheads are normally equipped with recessed studs and/or tie down rings for fastening cargo or accessories to the aircraft. These devices are not completely satisfactory as they do not hold the fastened item rigidly, and rigidity in an aircraft is oftentimes very important.

SUMMARY OF THE INVENTION

A fastening problem is overcome with the present invention which provides an assembly which is rigidly secured to a recessed stud to provide a threaded extension thereof. This threaded extension extends through a hole in the item to be secured and a nut engaged to the extension draws a washer thereon against the item which is pressed thereby to the bulkhead or deck.

Further objects and advantages of the invention will become apparent from the following specification and the accompanying drawings which are for the purpose of illustration only.

BRIEF DESCRIPTION OF THE DRAWINGS

FIG. 1 is a cross-sectional view of the fastener assembly of this invention attached to a structural element of a vehicle and securing a component item thereto;

FIG. 2 is a cross-sectional view taken along line 2—2 of FIG. 1;

FIG. 3 is an exploded view of the fastener shown in FIG. 1; and

FIG. 4 is a cross-sectional view similar to FIG. 1 but of an alternate embodiment in which the fastener assembly functions to locate the secure item to the sturctural element.

DESCRIPTION OF A PREFERRED EMBODIMENT

Shown in the drawings is a structural element or supporting base, as a partition 12, which may be a bulkhead, wall, ceiling or deck as in an aircraft, ship, tank or truck, and a fastener assembly 14 for securing a component 16 thereto. Formed in partition 12 is a cylindrical hole 18 which receives a recessed cup 20 having an outwardly flaring lip 22 that is bonded or otherwise cured to the surface of the partition surrounding the hole. An aperture 24 through the bottom of cup 20 receives a stud 26 so that head 28 thereof is located within the cup and threaded stem 30 of the stud extends through the cup so as to be engaged by a cooperating nut 32. A lock washer 34 is located on stem 30 between the underside of cup 20 and nut 32 to prevent the nut from loosening after being tightened to secure stud 26 to the cup. An annular channel 36 is provided in the circumferential edge of head 28 to form an annular flange 38 around the top portion thereof.

A headed pin 40 with a bifurcated shank 42 extends upwardly into cup 20 through a cooperating hole 44 in the bottom thereof and a connecting link 46 is pivotally connected at one end to the pin, between the bifurcated ends thereof, and at the other end to a cargo tie ring 48 so that the ring may be swung outwardly of the cup or downwardly thereinto over stud 26, as shown in FIGS. 1 and 2.

Fastener assembly 14, as shown in the embodiment illustrated in FIGS. 1 and 3, comprises an adaptor 50 which includes a cylindrical base section 52 and a conical nose section 54 extending upwardly therefrom. A T-slot 56 extends laterally into base section 52 normal to the central axis thereof and so that leg section 58 of the T-slot interrupts the bottom end of adaptor 50. T-slot 56, in cross-section, conforms to the vertical cross-section of head 28 through channel 36 and flange 38 at the diameters thereof to permit sidewise engagement of adaptor 50 with stud 26. T-slot 56 is terminated by a semi-cylindrical section 60 which connects sidewalls 62 thereof and which has the same conformation thereof so that the T-slot comprises a groove 64 and a lip 66, both of which are of U-configuration in lateral cross-section. With the sidewise engagement of adaptor 50 with stud 26, groove 64 receives flange 38 and lip 66 by channel 36 so that the adaptor is interlocked with the stud. Semi-cylindrical section 60 of T-slot 56 is so located that when adaptor 50 is in its assembled position with head 28 in contact with the semi-cylindrical section the adaptor is in axial alignment with stud 26.

Adaptor 50 is secured in its assembled position by an insert 68 which, in vertical cross-section, conforms to the vertical cross-section of T-slot 56 so as to be insertable thereinto. Insert 68 comprises a groove-section 70 which, when the insert is installed in T-slot 56, completes the circular configuration of groove 64 in adaptor 50, and a lip-section 72 which similarly completes the circular configuration of lip 66 thereby fully engaging adaptor 50 to stud 26. Insert 68 is also provided with an outside surface having the same radius as that of base section 52 so that when the insert is installed in T-slot 56 the cylindrical configuration of the base section is completed. A collar 74 having an inside diameter essentially the same as the outside diameter of base section 52 is slidable thereover to hold insert 68 in T-slot 56.

A threaded bore 76 extends axially through adaptor 50 from the top end thereof to T-slot 56 and received thereby is a set screw 78 which is provided with a hexagonal socket 80 for receiving a wrench to turn the set screw against the top surface of head 28 for preloading the interlocking contact between the head and adaptor. Nose section 54 is provided with a pair of parallel flats 81 located symmetrically from the axis of such section so the adaptor 50 may be held by an open end wrench when set screw 78 is tightened. Set screw 78 extends upwardly from adaptor 50 through hole 85 in component 16 and mounted on such extending portion 82 is a washer 84 having a diameter greater than that of such hole. A lock nut 86 is threadingly engaged with extending portion 82 so as to be tightened against washer 84 which is thereby forced against component 16 to firmly secure the component to partition 12. Lock washer 88 is located on extending portion 82 between locking nut 86 and washer 84 to prevent the nut from loosening.

Shown in FIG. 4 is an alternate embodiment of the invention whereby fastener assembly 100 is adapted to fixedly locate component 16 relative to partition 12 as well as secure the component thereto. This is accomplished by substituting for washer 84 a washer 102 with a stepped circumference comprising a small diameter portion 103, which is received by hole 85 with a minimum clearance therebetween, and a circumferential flange 104 which is contactable with the outer surface of component 16 around the hole to facilitate the location of washer 102 therein. In addition, cylindrical body portion 106 of adaptor 108 extends upwardly so as to be received with a minimum clearance by a central aperture 110 in washer 102. Relative shifting between component 16 and partition 12 is thereby prevented as washer 102 is blocked from lateral movement relative to fastener assembly 100, which is fixedly secured relative to partition 12 through cup 20 and stud 26, and the washer blocks any lateral movement of the component relative thereto.

I wish it to be understood that I do not desire to be limited to the exact details of construction shown and described, for obvious modifications will occur to a person skilled in the art.

I claim:

1. In combination with a structural element, a stud mounted to said structural element and comprising a protruding head with an annular channel around the circumferential edge thereof and an annular flange formed thereby, and a component secured to said structural element and including a hole of cylindrical configuration, the improvement comprising a screw, an adaptor mounting said screw to said head with axial extension therefrom, said adaptor comprising a threaded bore having axial alignment with said stud and threadingly receiving said screw, a slot extending laterally into said adaptor receiving said head by sidewise entry thereinto, said slot being of T-configuration and with a vertical cross-section conforming to the vertical cross-section of said head at said channel and said flange along the diameters thereof, a semi-cylindrical section terminating said T-slot locating said adaptor in axial alignment with said stud and an insert having a vertical cross-section similar to that of said T-slot and inserted thereinto to secure said adaptor in axial alignment with said stud, a collar slidable over said adaptor holding said insert in said T-slot, a groove of U-configuration in lateral cross-section formed by said T-slot and said semi-cylindrical section thereof receiving said flange and a lip of U-configuration similarly formed engaging said channel, said groove and said lip having cooperation with said flange and said channel thereby locating said adaptor in axial alignment with said stud and said groove and said lip sections of said insert disposed respectively to complete the circular configuration of said groove and said lip, a washer having a stepped circumference including a flange having a diameter greater than that of said hole and a small diameter portion received by said hole with a minimum of clearance and comprising a central aperture receiving said adaptor with a minimum clearance thereby locating said component respective to said structural element.

2. The invention as defined in claim 1 wherein said structural element comprises a bulkhead in an aircraft, ship, tank and truck.

3. The invention as defined in claim 1 wherein said structural element comprises a deck in an aircraft, ship and tank.

4. The invention as defined in claim 1 wherein said structural element comprises a platform in a truck.

5. The invention as defined in claim 1 wherein said structural element comprises a ceiling in an aircraft, ship, tank and truck.

* * * * *